US007734691B2

(12) United States Patent
Creamer et al.

(10) Patent No.: US 7,734,691 B2
(45) Date of Patent: Jun. 8, 2010

(54) PROVIDING COLLABORATION SERVICES TO A WIRELESS DEVICE

(75) Inventors: Thomas E. Creamer, Boca Raton, FL (US); Joseph H. McIntyre, Austin, TX (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1183 days.

(21) Appl. No.: 10/739,671

(22) Filed: Dec. 18, 2003

(65) Prior Publication Data

US 2005/0135347 A1    Jun. 23, 2005

(51) Int. Cl.
*G06F 15/16* (2006.01)
*H04L 12/66* (2006.01)

(52) U.S. Cl. .................. 709/204; 709/206; 709/230; 709/205; 370/352

(58) Field of Classification Search .................. 709/206, 709/204, 230; 370/352
See application file for complete search history.

(56) References Cited

U.S. PATENT DOCUMENTS

| 6,336,137 | B1 | 1/2002 | Lee et al. | |
| 6,947,738 | B2* | 9/2005 | Skog et al. | 455/426.1 |
| 7,130,390 | B2* | 10/2006 | Abburi | 379/88.17 |
| 2002/0013827 | A1 | 1/2002 | Edstrom et al. | |
| 2002/0026471 | A1* | 2/2002 | Bent et al. | 709/101 |
| 2002/0073162 | A1 | 6/2002 | McErlean | |
| 2002/0077080 | A1 | 6/2002 | Greene | |
| 2002/0086706 | A1 | 7/2002 | Chen et al. | |
| 2002/0101848 | A1 | 8/2002 | Lee et al. | |
| 2002/0120719 | A1 | 8/2002 | Lee et al. | |
| 2002/0177453 | A1 | 11/2002 | Chen et al. | |
| 2002/0184391 | A1 | 12/2002 | Phillips | |
| 2002/0188589 | A1 | 12/2002 | Salmenkaita et al. | |
| 2002/0194336 | A1* | 12/2002 | Kett et al. | 709/225 |
| 2003/0051036 | A1 | 3/2003 | Wang et al. | |
| 2003/0126074 | A1* | 7/2003 | Klatt et al. | 705/39 |
| 2004/0067753 | A1* | 4/2004 | Berg et al. | 455/435.1 |
| 2004/0103214 | A1* | 5/2004 | Adwankar et al. | 709/246 |
| 2004/0179668 | A1* | 9/2004 | Gilbert et al. | 379/210.01 |
| 2005/0008000 | A1* | 1/2005 | Korycki et al. | 370/352 |

FOREIGN PATENT DOCUMENTS

| GB | 2318701 | 4/1998 |
| WO | WO 02/058418 A1 | 7/2002 |

OTHER PUBLICATIONS

Open API Solutions. "OSA/Parlay". 2002 <http://www.openapisolutions.com/brochures/OSAParlayOverview.pdf>.*
Kellerer, W., et al., "A Communication Gateway for Infrastructure Independent Wireless Access", IEEE Communications, vol. 40, No. 3, pp. 126-131, (Mar. 2002).

* cited by examiner

*Primary Examiner*—Philip J Chea
(74) *Attorney, Agent, or Firm*—Novak Druce + Quigg LLP

(57) ABSTRACT

A method for establishing collaborative communications can include the step of receiving a request for a collaborative session with a designated user from an originating client. An intermediate client can be enabled, where the intermediate client can be deployed within a server that is communicatively linked to the originating client through an Internet protocol network. A mobile device associated with the designated user can be determined. A communication session can be initialized across a wireless network between the intermediate client and the mobile device. At least one collaboration message can be conveyed between the originating client and the mobile device using the intermediate client as a communication intermediary.

14 Claims, 3 Drawing Sheets

US 7,734,691 B2

PROVIDING COLLABORATION SERVICES TO A WIRELESS DEVICE

BACKGROUND

1. Field of the Invention

The present invention relates to the field of computer software and, more particularly, to a means for providing collaboration services to wireless devices.

2. Description of the Related Art

Collaboration software is software that permits people to exchange ideas and work products in real-time from geographically disperse locations. Collaboration software components can include Web conferencing, video and telephony teleconferencing, instant messaging, chatting, co-browsing, and the like. Effective use of collaboration software can result in substantial time and cost savings because collaboration software can result in effective communications among individuals without requiring the individuals to be located in the same physical location.

Conventional collaboration software solutions can require that two users be subscribed to a collaboration server and be online before collaboration communications can be established between the two. For example, in order for a first user to send an instant message to a second user, both users have to subscriber to a common instant messaging server and both users have to be online and communicatively linked via an Internet Protocol (IP) network.

Requiring both users be linked via and IP network ignores many communication possibilities with mobile computing devices, which can be accessible via a mobile wireless network. That is, conventional technologies do not permit a user to initiate collaborative communications from a client computing device with a second user having access to a mobile computing device. For example, conventional collaborative software solutions do not permit instant messaging communications between a desktop computer user and a user of a mobile telephone and/or personal data assistant that is communicatively linked to desktop computer through a mobile telephone switching office (MTSO).

SUMMARY OF THE INVENTION

The present invention provides a method, a system, and an apparatus for providing collaborative services to a mobile device via a wireless communication link. That is, the present invention provides collaboration services to mobile devices through a standardized gateway for network services, such as a Parlay gateway. More specifically, a collaboration client can initiate an intermediate client deployed within a service provider environment. The intermediate client can communicate with the collaboration client through an Internet protocol (IP) network. The intermediate client can also establish communications through the Parlay gateway with the mobile device. In one arrangement, the intermediate client can be an automated Java servlet that functions as a communication intermediary.

Two different components can be included within the Parlay gateway to facilitate communications with the mobile device. One gateway component can handle communication between itself and the intermediate client. For example, distributed program objects that conform to the Common Object Request Broker Architecture (CORBA) can be defined by the gateway component and can be used to convey data between the Parlay gateway and the intermediate client. A second gateway component can handle communications between itself and a Wireless Access Protocol (WAP) gateway linked to the mobile device. A multitude of different ones of the second gateway component can be used, where each such component can be customized to permit communications with a particular WAP gateway or client applications linked to a WAP gateway.

One aspect of the present invention can include a method for establishing collaborative communications. The method can include the step of receiving a request for a collaborative session with a designated user from an originating client. An intermediate client can be enabled, where the intermediate client can be included within a server that is communicatively linked to the originating client through an Internet protocol network. In one embodiment, the request can be received by a collaborative server that is remotely located from the server that contains the intermediate client. The remotely located server can be a Lotus Sametime type server. A mobile device associated with the designated user can be determined. A communication session can be initialized across a wireless network between the intermediate client and the mobile device. At least one collaboration message can be conveyed between the originating client and the mobile device using the intermediate client as a communication intermediary.

In one embodiment, a gateway can be provided between the intermediate client and the mobile device. In a particular embodiment, the gateway can be a Parlay gateway. The gateway can include at least one standardized application program interface (API) for managing network services. Data can be conveyed between the intermediate client and the gateway in a manner that conforms to messaging standards defined for the API. Additionally, the data can be conveyed using distributed program objects that conform to the Common Object Request Broker Architecture (CORBA). Further, a component can be initialized within the gateway that is generic to the intermediate client. Another component can be initiated within the gateway that is specific to a mobile gateway associated with the mobile device. Communications between the mobile device and the gateway can be established through these two components.

In another embodiment, a communication gateway can be provided between the intermediate client and the mobile device. Information can be conveyed between the intermediate client and the communication gateway in a manner that conforms to a Wireless Access Protocol (WAP) defined for the communication gateway. The communication gateway can directly communicate to the mobile device through a Mobile Telephone Switching Office (MTSO).

Another aspect of the present invention can include a system for providing collaboration communications. The system can include an intermediate client, a Parlay gateway, and a WAP gateway. The intermediate client can establish communications between a desktop collaboration client and a mobile collaboration client. The desktop collaboration client can be communicatively linked to the intermediate client across an Internet Protocol network. The mobile collaboration client can be communicatively linked to the intermediate client across a mobile communications network. The Parlay gateway can be deployed between the intermediate client and the mobile collaboration client. Additionally, the WAP Gateway can be deployed between the Parlay gateway and the mobile collaboration client. The WAP gateway can communicates to the mobile collaboration client through a MTSO. In one embodiment, the Parlay gateway can include an intermediate client component configured to exchange data between the intermediate client and the Parlay gateway. The Parlay gateway can also include a WAP component configured to exchange data between the Parlay gateway and the WAP gateway.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
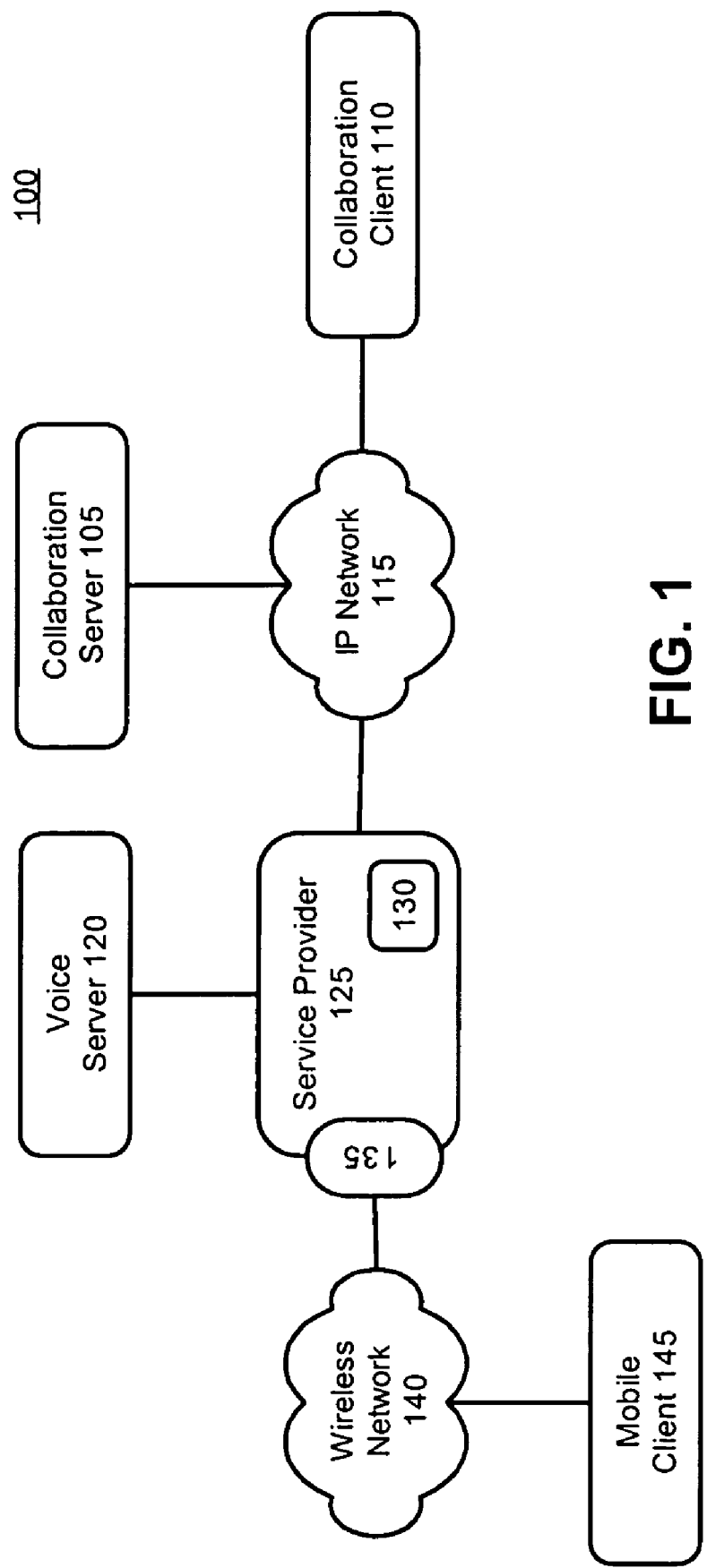
FIG. 1 is a schematic diagram illustrating a system for providing collaboration services to a mobile client in accordance with the inventive arrangements disclosed herein.

FIG. 1 is a schematic diagram illustrating a system 100 for providing collaboration services to a mobile client in accordance with the inventive arrangements disclosed herein. The system 100 can include a collaboration server 105, a collaboration client 110, a service provider 125, and a mobile client 145. The collaboration server 105 can handle one or more collaboration services, such as instant messaging services, e-mail services, teleconferencing sessions, chat sessions, co-browsing, Web broadcasts, and the like. In one embodiment, the collaboration server 105 can be a Lotus Sametime™ type server.

The collaborative client 110 can be a collaboration client deployed within a computing device, such as a desktop computer. The collaboration client 110 can subscribe to the collaboration server 105 across an Internet protocol network 115. The network 115 can include the Internet, an intranet, a Local Area Networks (LAN), a Wide Area Network (WAN), and the like. Further, the network 115 can include secure and open communication pathways. Moreover, the network 115 can utilize land based communication lines, such Public Switched Telephone Network (PSTN) lines and coaxial cable lines, as well as wireless communication links.

The mobile client 145 can be a collaboration client deployed within a mobile device, such as a personal data assistant (PDA), a mobile telephone, an in-vehicle information system, and the like. Communications can be conveyed to the mobile client 145 across a wireless network. The wireless network 140 can be a network, such as a public land mobile network (PLMN), used to establish telephony and/or Internet communications with the mobile client 145.

The mobile client 145 can access the Internet over a data channel or a voice channel. Data channel communications can involve data transport through a wireless communication data transport protocol, such as the Wireless Access Protocol (WAP). Access to the Internet across a voice channel can require the use of speech services, such as automatic speech recognition (ASR), synthetic speech generation, Voice Extensible Markup Language (VoiceXML) interpretation, and the like, that can be provided by a voice server 120.

The service provider 125 can be the entity that provides service users with one or more services, such as telephony services, Internet services, cable services, video services, word processing services, interactive voice response (IVR) services, voice-messaging services, and the like. The service provider 125 can provide network connectivity to a multitude of users, where the network connectivity can include Internet connectivity across a Wireless network 140 as well as connectivity across the IP network 115.

The service provider 125 can include an intermediate client 130 that can facilitate collaborative communications between the collaboration client 110 and the mobile client. In one embodiment, the intermediate client 130 can be a virtual collaboration client that can be used to proxy collaboration communications. That is, the collaboration client 110 can communicate with the intermediate client 130 through a standard collaboration interface in lieu of communicating directly with the mobile client 145. The intermediate client 130 can convey the collaboration data received from the collaboration client 110 to the mobile client 145 using suitable communication channels and protocols.

One or more gateways 135 can be used by the intermediate client 130 when communicating to the mobile client 145. In one embodiment, the gateway 135 can include a standardized gateway for managing network services that can include one or more libraries for facilitating message conveyance. For example, the gateway 135 can provide one or more application program interfaces (APIs) and related libraries for facilitating secure communications across dissimilar networks. One such gateway 135 can be a Parlay gateway. Network services managed by the gateway 135 can include locally provided services, Web services, remote procedural call (RPC) services, and/or the like.

In another embodiment, the gateway 135 can include a communications gateway specific to the wireless network 140. For example, the gateway 135 can be a WAP gateway. In such an embodiment, the gateway 135 can directly communicate to the mobile client 145 through a Mobile Telephone Switching Office (MTSO) using standardized communication libraries and/or routines.

As used herein, a Lotus Sametime™ type application can include any application past and future that is part of the Lotus Sametime™ family of applications as well as compatible and approximately equivalent applications. It should be emphasized that a Lotus Sametime™ type application is just one embodiment of the present invention, which is generally applicable to any IM client and/or collaboration software solution.

Figure 2:
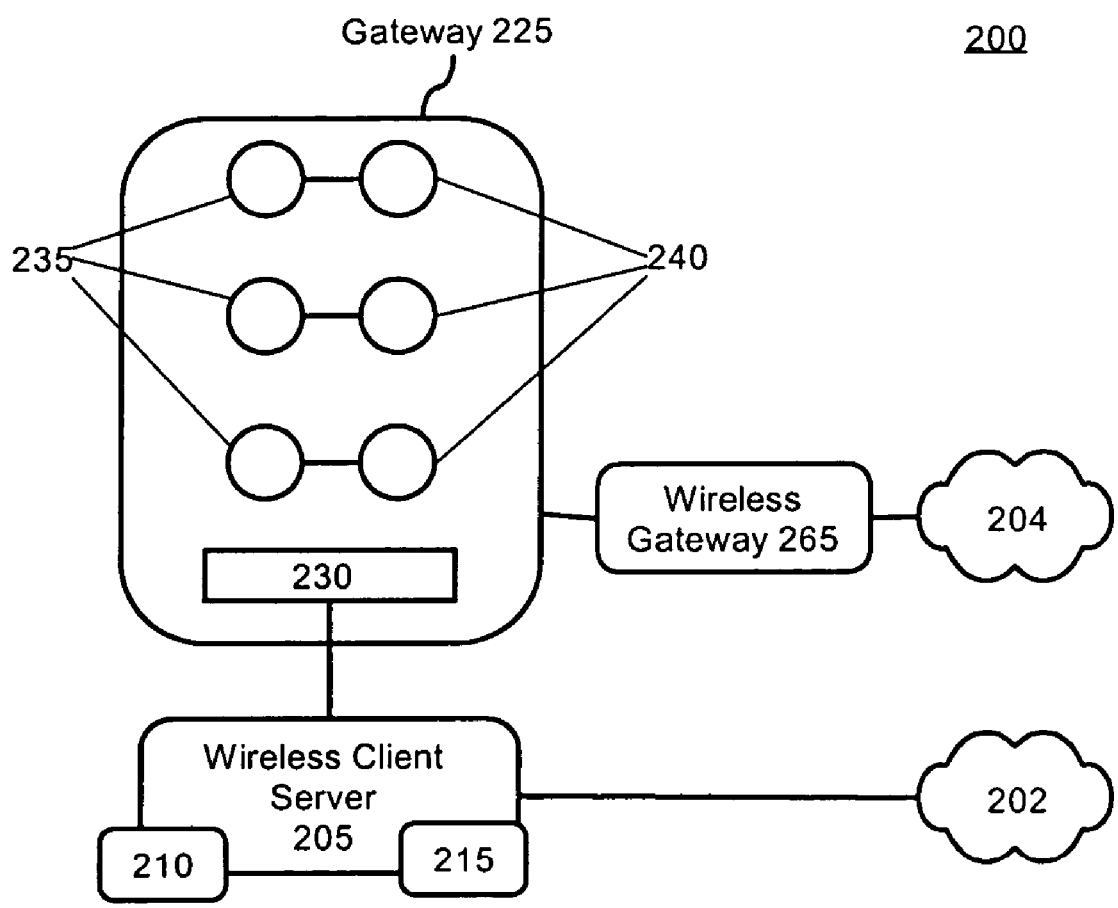
FIG. 2 is a schematic diagram illustrating another system for providing collaboration services to a mobile client in accordance with the inventive arrangements disclosed herein.

FIG. 2 is a schematic diagram illustrating a system 200 for providing collaboration services to a mobile client in accordance with the inventive arrangements disclosed herein. In one embodiment, the system 200 can represent one embodiment for the service provider 125 and the gateway 135 illustrated in FIG. 1. The system 200 can include a wireless client server 205, a gateway 225, and a wireless gateway 265.

The wireless client server 205 can receive a request for collaboration with a designated user via an IP network 202. Responsive to the request, the wireless client server 205 can provide a communication link with a mobile collaboration client communicatively linked to a wireless network 204.

The wireless client server 205 can be a stand-alone application or can be integrated within an application that provides Internet, intranet, Web solutions, and the like for a service provider. For example, the wireless client server 205 can be a component of a solution like WebSphere™ by International Business Machines (IBM) Corporation of Armonk, N.Y. More specifically, the wireless client server 205 can be an application included within a WebSphere Application Server for Telecommunication (WAS-T) for providing telecommunications Web services within the WebSphere solution platform.

The wireless client server 205 can instantiate an intermediate client for collaboration services. The intermediate client can utilize a collaboration engine 210 and a component engine 215. The collaboration engine 210 can include modular server-side applications used to perform designated functions of the wireless client server 205. For example, the collaboration engine 210 can include one or more Java™ servlets that perform collaboration functions. In another example, the collaboration engine 210 can initiate one or more Common Gateway Interface (CGI) applications.

The component engine 215 can include a series of interface routines used by the collaboration engine 210. For example, the component engine 215 can include Enterprise Java Beans (EJB) components that can be used in conjunction with the collaboration engine 120 when Java servlets and/or Java Beans are used by the application engine 210. In another example, the component engine 215 can include components that comply with the Component Object Model/Distributed Component Object Model (COM/DCOM) architecture. The component engine 215 can also include one or more Application Program Interface (API) modules necessary to establish communications between the wireless client server 205 and the gateway 225.

The gateway 225 can represent a layered solution for managing network services that facilities software reuse. In one embodiment, the gateway 225 can be an Open Services Architecture (OSA)/Parlay gateway. The gateway can include a framework 230, one or more general-purpose components 235, and one or more service-specific components 240. The framework 230 can include the established protocols and architecture for the gateway 225, such as the OSA/Parlay framework. The framework 230 can also manage the initialization of the gateway 225 components needed to execute installed Web services.

The general-purpose components 235 can be generic in nature and can be used to interface with a variety of different services provided by the gateway 225. One such general-purpose component 235 can be used as an interface between the gateway 225 and the wireless client server 205. For example, the general-purpose component 235 can include specifications, libraries, and/or routines for conveying information between the wireless client server 205 and the gateway 225 using distributed objects, such as CORBA objects. In such an example, an EJB activated by the component engine 215 can interface with an API for gateway 225 to exchange messages between the wireless client server 205 and the gateway 225. Further, the API can be defined by and/or use routines of the general-purpose component 235.

The service-specific components 240 can define an interface for a particular wireless gateway 265. Different wireless gateways 265 can require different service-specific components. The wireless gateway 265 can communicate to a mobile device linked to the wireless network 204 through a MTSO. When the wireless gateway 265 is a WAP device, a WAP client can be installed within the mobile device that receives collaboration communications.

Figure 3:
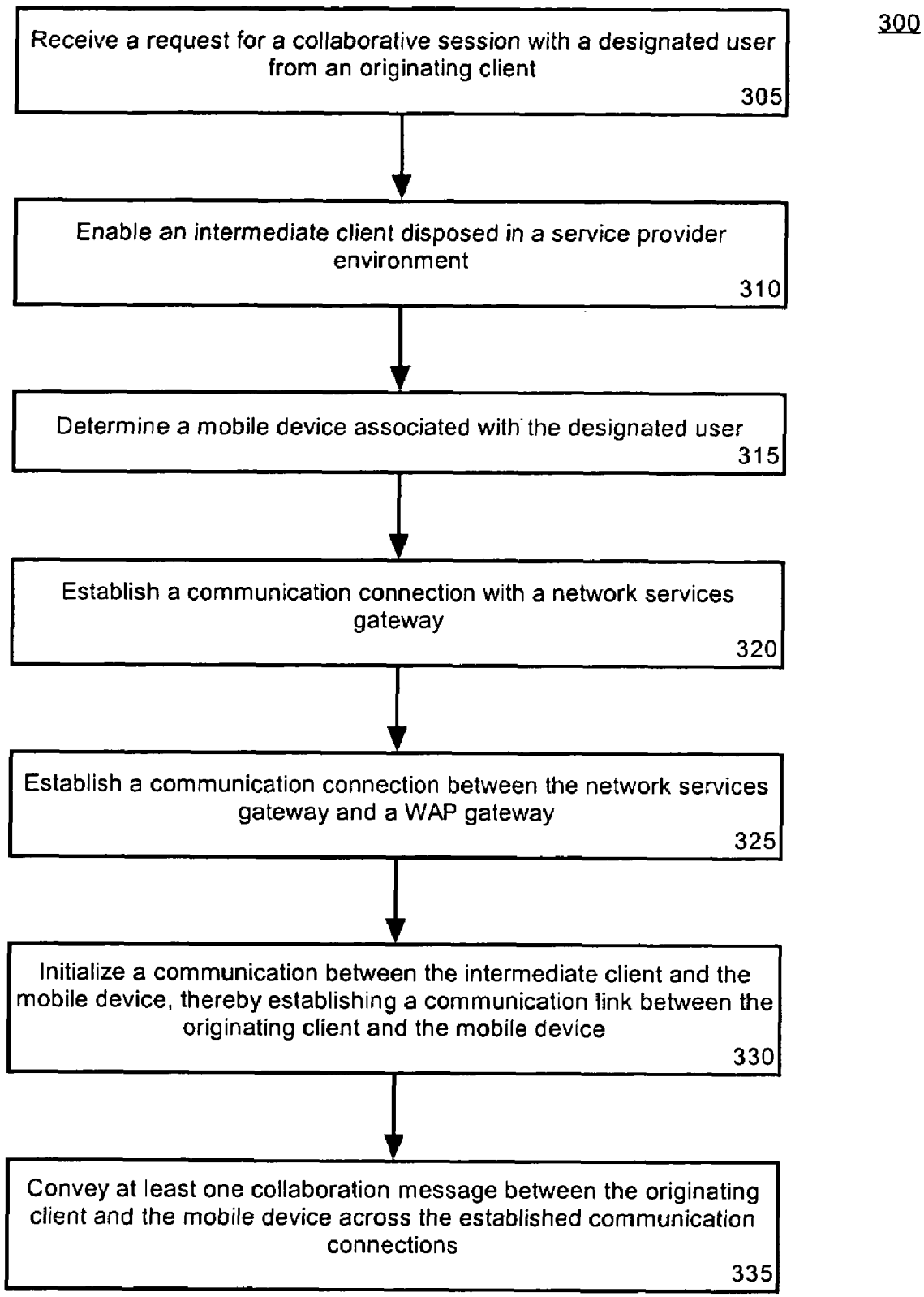
FIG. 3 is a flow chart illustrating a method for establishing collaborative communications with a mobile device in accordance with the inventive arrangements disclosed herein.

FIG. 3 is a flow chart illustrating a method 300 for establishing collaborative communications with a mobile device in accordance with the inventive arrangements disclosed herein. The method 300 can be performed in the context of a collaborative communications system including a collaboration server, a collaboration client executing within a computer, and a mobile collaboration client executing within a mobile computing device. The method 300 can begin in step 305, where a request can be received for a collaboration session with a designated user. The request can be received by a collaboration server, such as a Lotus Sametime type server. The request can originate from an originating client communicatively linked to the collaboration server via an Internet protocol network.

In step 310, an intermediate client that is deployed within a service provider environment can be enabled. For example, the intermediate client can be a Java servlet that is initiated within a server of the service provider responsive to the collaboration request. In step 315, a mobile device that is associated with the designated user can be determined. In step 320, a communication connection can be established between the intermediate client and a network services gateway. For example, a component within a Parlay gateway can be instantiated so that distributed objects like CORBA objects can be conveyed between the intermediate client and the Parlay gateway. In step 320, a communication connection can be established between the network services gateway and a WAP gateway. In one embodiment, the network services gateway can include a multitude of components customized for the communication protocols of specific WAP gateways. In such an embodiment, a WAP component can be instantiated with the network services gateway to establish the communication connection with the WAP gateway.

In step 330, a communication connection can be initialized between the intermediate client and the determined mobile device, thereby creating a communication between the originating client and the mobile device that utilizes the intermediate client as a communication intermediary. In step 335, at least one collaboration message can be conveyed between the originating client and the mobile device across the established communication connections.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for providing collaborative services to a mobile device accessible via a mobile network comprising the steps of:
    receiving a request for a collaborative session with a mobile client from an originating non-mobile client communicatively linked to a collaboration server of a service provider via an Internet protocol network;
    enabling an intermediate client deployed within the service provider environment;
    determining a mobile device associated with said mobile client;
    establishing a communication connection between the intermediate client and a network services gateway, wherein said network services gateway includes at least one standardized application program interface for managing network services, and wherein data are conveyed between said intermediate client and said network services gateway in a manner that conforms to messaging standards defined for the application program interface;

establishing a communication connection between the network services gateway and a mobile gateway of the mobile network;

initiating a component within said network services gateway that is generic to said intermediate client;

initiating a component within said network services gateway that is specific to the mobile gateway associated with said mobile device;

initializing a communication connection between the intermediate client and the mobile device, thereby creating a communication between the originating non-mobile client and the mobile device; and conveying at least one collaboration message between said originating non-mobile client and said mobile device using said intermediate client as an intermediary.

2. The method of claim 1, wherein the collaborative server is remotely located from a server that contains said intermediate client, wherein said collaborative server receives said request during said receiving step and responsively initiates said enabling step.

3. The method of claim 1, wherein said step of conveying data further comprises the step of:

conveying said data using distributed program objects that conform to at least one of a Common Object Request Broker Architecture, a Distributed Object Model, and an architecture for Web service bindings.

4. The method of claim 1, wherein said network services gateway is a Parlay gateway.

5. The method of claim 1, further comprising the step of:

conveying information between said intermediate client and said mobile gateway in a manner that conforms to a Wireless Access Protocol defined for said mobile gateway.

6. The method of claim 5, wherein said mobile gateway directly communicates to said mobile device through a Mobile Telephone Switching Office.

7. The method of claim 1, further comprising the step of:

sending at least one voice-based message between said mobile device and said originating non-mobile client, said intermediate client using a voice server to process said voice-based message prior to sending said voice-based message to said originating non-mobile client.

8. A system for providing collaborative services to a mobile device accessible via a mobile network comprising:

means for receiving a request for a collaborative session with a mobile client from an originating non-mobile client communicatively linked to a collaboration server of a service provider via an Internet protocol network;

means for enabling an intermediate client deployed within the service provider environment;

means for determining a mobile device associated with said mobile client;

means for establishing a communication connection between the intermediate client and a network services gateway, wherein said network services gateway includes at least one standardized application program interface for managing network services, and wherein data are conveyed between said intermediate client and said network services gateway in a manner that conforms to messaging standards defined for the application program interface;

means for establishing a communication connection between the network services gateway and a mobile gateway of the mobile network;

means for initiating a component within said network services gateway that is generic to said intermediate client;

means for initiating a component within said network services gateway that is specific to the mobile gateway associated with said mobile device;

means for initializing a communication connection between the intermediate client and the mobile device, thereby creating a communication between the originating non-mobile client and the mobile device; and means for conveying at least one collaboration message between said originating non-mobile client and said mobile device using said intermediate client as an intermediary.

9. A machine-readable storage having stored thereon, a computer program having a plurality of code sections, said code sections executable by a machine for causing the machine to perform a method for providing collaborative services to a mobile device accessible via a mobile network comprising the steps of:

receiving a request for a collaborative session with a mobile client from an originating non-mobile client communicatively linked to a collaboration server of a service provider via an Internet protocol network;

enabling an intermediate client deployed within the service provider environment;

determining a mobile device associated with said mobile client;

establishing a communication connection between the intermediate client and a network services gateway, wherein said network services gateway includes at least one standardized application program interface for managing network services, and wherein data are conveyed between said intermediate client and said network services gateway in a manner that conforms to messaging standards defined for the application program interface;

establishing a communication connection between the network services gateway and a mobile gateway of the mobile network;

initiating a component within said network services gateway that is generic to said intermediate client;

initiating a component within said network services gateway that is specific to the mobile gateway associated with said mobile device;

initializing a communication connection between the intermediate client and the mobile device, thereby creating a communication between the originating non-mobile client and the mobile device; and conveying at least one collaboration message between said originating non-mobile client and said mobile device using said intermediate client as an intermediary.

10. The machine-readable storage of claim 9, further comprising the step of: providing a collaborative server that is remotely located from said server that contains said intermediate client, wherein said collaborative server receives said request during said receiving step and responsively initiates said enabling step.

11. The machine-readable storage of claim 9, wherein said step of conveying data further comprises the step of:

conveying said data using distributed program objects that conform to at least one of a Common Object Request Broker Architecture, a Distributed Object Model, and an architecture for Web service bindings.

12. The machine-readable storage of claim 9, wherein said network services gateway is a Parlay gateway.

13. The machine-readable storage of claim 9, the method further comprising the step of:
   conveying information between said intermediate client and said mobile gateway in a manner that conforms to a Wireless Access Protocol defined for said mobile gateway.

14. The machine-readable storage of claim 13, wherein said mobile gateway directly communicates to said mobile device through a Mobile Telephone Switching Office.

* * * * *